US006337638B1

(12) United States Patent
Bates et al.

(10) Patent No.: US 6,337,638 B1
(45) Date of Patent: Jan. 8, 2002

(54) VEHICLE WARNING SYSTEM AND METHOD BASED ON SPEED DIFFERENTIAL

(75) Inventors: Cary Lee Bates; Michael Martin Tomashek, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/558,316

(22) Filed: Apr. 25, 2000

(51) Int. Cl.⁷ .................................................. G08G 1/00
(52) U.S. Cl. ........................ 340/904; 340/904; 340/905; 340/435; 340/436
(58) Field of Search ................................ 340/435, 438, 340/901, 904, 436, 903

(56) References Cited

U.S. PATENT DOCUMENTS

| | | | | |
|---|---|---|---|---|
| 3,697,985 A | | 10/1972 | Faris et al. ................ 345/5 PD |
| 3,898,652 A | * | 8/1975 | Rashid ........................ 343/6 R |
| 4,028,662 A | | 6/1977 | Young .......................... 340/32 |
| 4,210,357 A | | 7/1980 | Adachi ...................... 296/84 B |
| 4,349,823 A | * | 9/1982 | Tagami et al. ................. 343/7 |
| 4,694,295 A | * | 9/1987 | Miller et al. ................ 340/903 |
| 5,235,316 A | * | 8/1993 | Qualizza ..................... 340/436 |
| 5,341,344 A | * | 8/1994 | O'Brien et al. ............... 367/96 |
| 5,357,438 A | * | 10/1994 | Davidian .................... 364/461 |
| 5,631,639 A | * | 5/1997 | Hibino et al. ............... 340/903 |
| 5,767,793 A | | 6/1998 | Agravante et al. .......... 340/903 |
| 5,805,103 A | * | 9/1998 | Doi et al. ..................... 342/70 |
| 5,835,007 A | * | 11/1998 | Kosiak ....................... 340/436 |
| 5,929,786 A | * | 7/1999 | Schofield et al. ........... 340/903 |
| 6,031,484 A | * | 2/2000 | Bullinger et al. ............. 342/72 |
| 6,133,825 A | * | 10/2000 | Matsuoka ................... 340/436 |
| 6,203,120 B1 | * | 3/2001 | Urai et al. .................. 303/125 |

\* cited by examiner

*Primary Examiner*—Jeffery Hofsass
*Assistant Examiner*—Son Tang
(74) *Attorney, Agent, or Firm*—Thomason, Moser & Patterson, L.L.P.; Gero G. McClellan

(57) ABSTRACT

The present invention provides a method, apparatus and article of manufacture for detecting the presence of one or more target vehicles and determining a distance and speed of the targeted vehicles relative to a targeting vehicle. When predetermined threshold conditions are satisfied, warning signals are output from a computer system to alert a driver of the one or more targeted vehicles. In addition, steps may be taken to determine whether the targeting vehicle and the one or more targeted vehicles will converge to create a congested condition. If so, the speed of the targeting vehicle maybe adjusted.

24 Claims, 5 Drawing Sheets

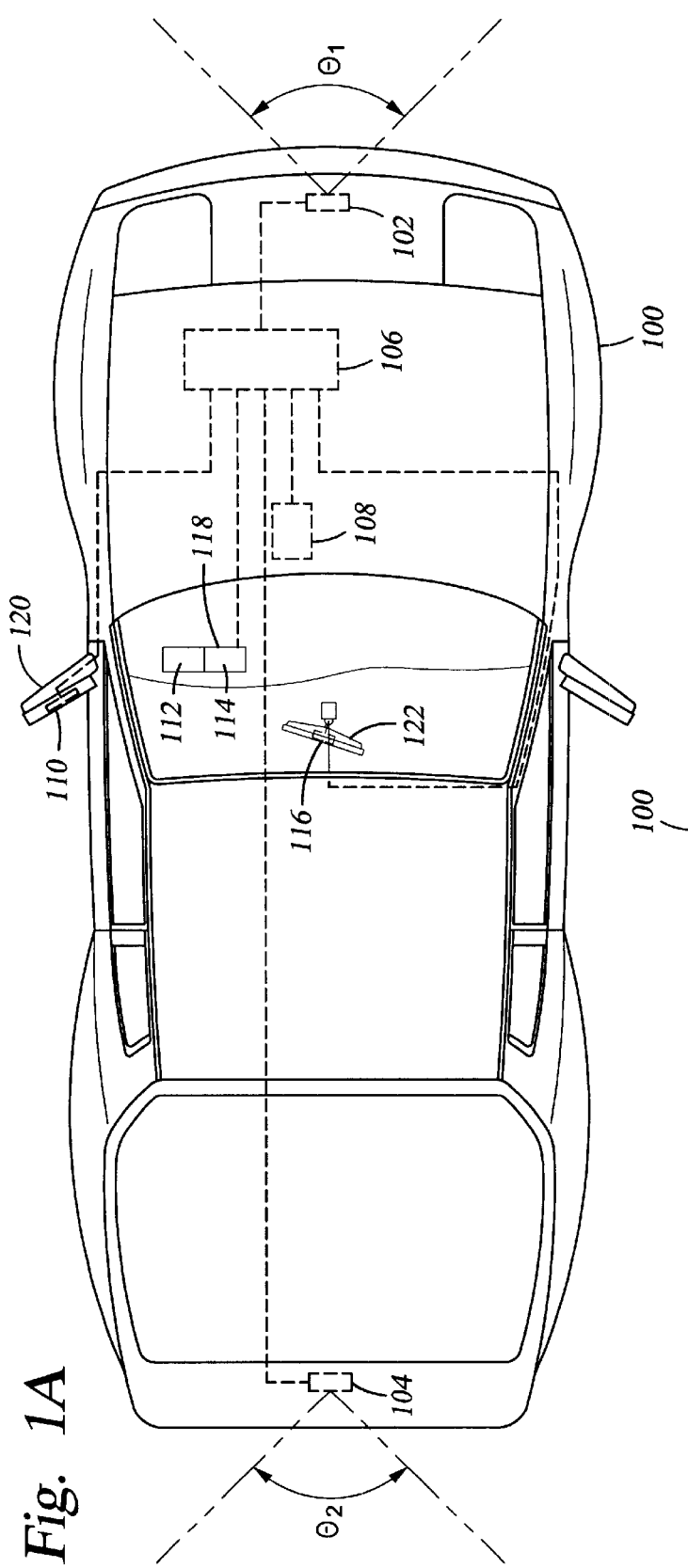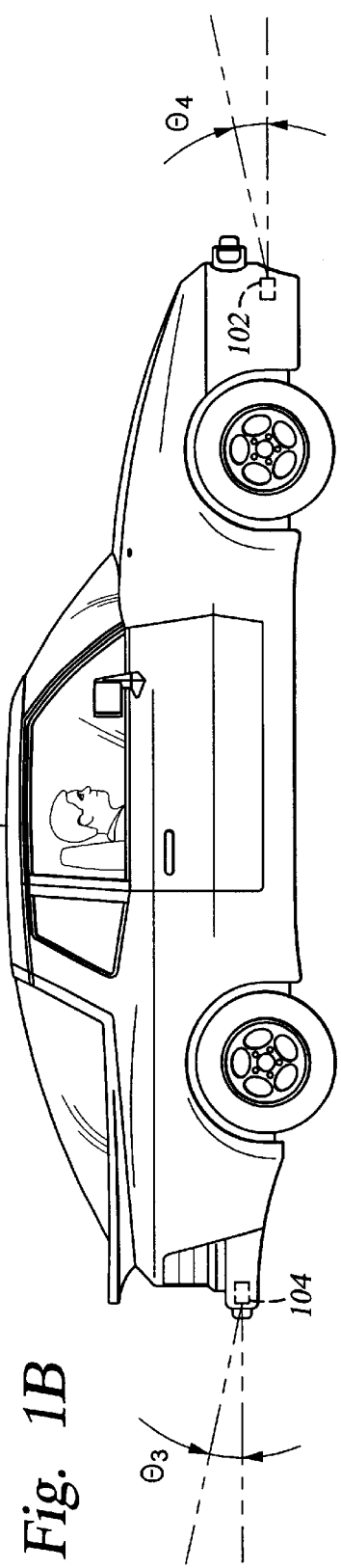

VEHICLE WARNING SYSTEM AND METHOD BASED ON SPEED DIFFERENTIAL

BACKGROUND OF THE INVENTION

1. Field of the Invention

The present invention relates to a target detection system for a vehicle and, more particularly, determining a relative distance and speed of a target vehicle.

2. Background of the Related Art

Drivers are required to make numerous judgments regarding the driving environment while operating a vehicle. In particular, drivers are required to discern the relative position and change in position with regard to other vehicles both behind and in front of the driver's vehicle. The increased volume of traffic experienced on multi-lane highways make determining speed differentials and relative positions increasingly more difficult for a driver. For example, drivers are often faced with the problem of having to make a quick exit from the far lane of traffic. This requires the driver to make a hasty determination about the immediate driving environment. A cautious driver may check his or her rearview or sideview mirrors to ascertain the relative position of nearby vehicles.

However, conventional driving aids such as mirrors are not well suited for quickly and accurately ascertaining the dynamic driving conditions with which drivers are faced. As a result, drivers often misjudge their abilities to negotiate a given driving situation. Such misjudgments can lead to substantial property damage as well as the injury or debt of drivers or pedestrians.

One attempt to solve the problem is the use of radar systems. Such an approach involves mounting a radar system to a vehicle and operating a radar system to determine the presence of other vehicles in a detection zone. Such systems merely serve to notify an operator of vehicles in the blind spots of mirror-based detection systems. As a result, operators are unable to determine the driving behavior for a particular vehicle and are limited in their ability to predict future driving situations relative to the detected vehicles.

Therefore, there is a need for a method and apparatus adapted to detect the presence of proximate vehicles and predict a future state of the vehicle and proximate vehicles.

SUMMARY

The present invention provides an apparatus, method and article of manufacture for determining relative speeds between vehicles. In one aspect of the invention, a computer system comprises a detection system disposable on a vehicle and configured to detect at least a speed of one or more target vehicles relative to the vehicle, a signal processing unit coupled to the detection system and configured to transmit a warning signal when a speed of a detected target vehicle is greater than a threshold speed relative to the vehicle and one or more output devices configured to receive the warning signal.

In another aspect of the invention, an apparatus comprises a vehicle comprising a rearview mirror; a detection system disposed on the vehicle and configured to detect at least a speed of one or more target vehicles relative to the vehicle; a signal processing unit coupled to the detection system and configured to transmit a warning signal when the speed of a detected target vehicle is greater than a threshold speed relative to the vehicle. The signal processing unit is further configured to determine a possibility of a congestion condition between the vehicle and the one or more target vehicles; wherein the congestion condition occurs when at least one of the vehicle and the one or more target vehicles is required to adjust vehicle speed. One or more output devices are disposed on the rearview mirror and configured to receive the warning signal and output a warning of the congestion condition.

In still another aspect of the invention, a signal bearing medium containing a program which, when executed by one or more processors, causes the one or more processors to perform steps comprising detecting at least a first target vehicle; determining whether the first targeted vehicle is approaching the targeting vehicle at a speed greater than a threshold speed; and if the speed is greater than the threshold speed, outputting a warning signal from an output device disposed on the targeting vehicle.

In yet another aspect of the invention, a method for operating a target vehicle detection system disposed on a targeting vehicle, comprises detecting at least a first target vehicle; determining whether the first targeted vehicle is approaching the targeting vehicle at a speed greater than a threshold speed; and if the speed is greater than the threshold speed, outputting a warning signal from an output device disposed on the targeting vehicle.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1A is a top schematic view of a vehicle having an onboard detection system and signal processing unit.

FIG. 1B is a side view of a vehicle illustrating an angular detection pattern for a detection system of the vehicle.

DETAILED DESCRIPTION OF THE PREFERRED EMBODIMENT

Figure 2:
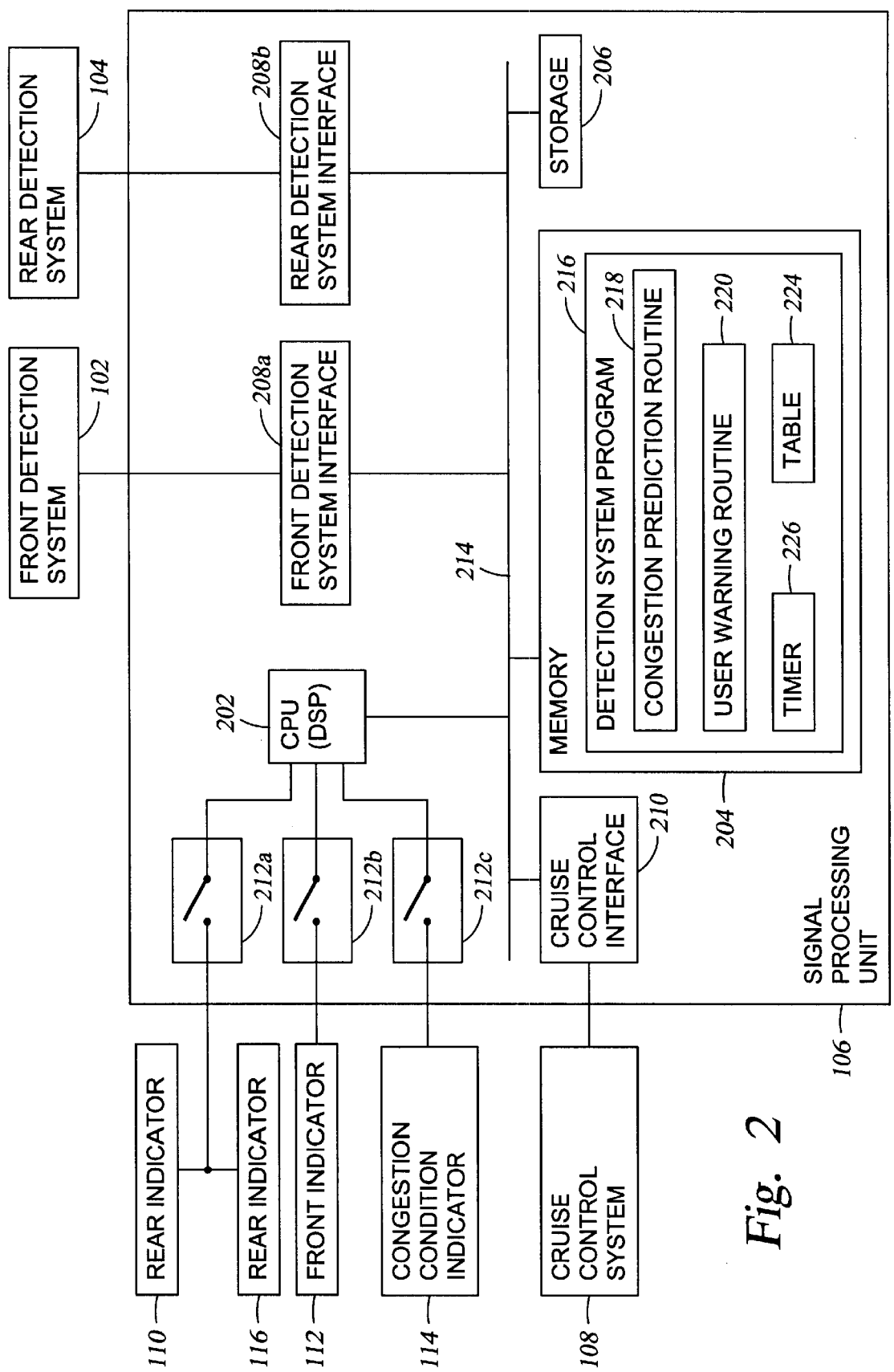
FIG. 2 is a simplified schematic of a control system for a vehicle.

The present invention provides a method, apparatus and article of manufacture for detecting the presence of one or more target vehicles and determining a distance and speed of the targeted vehicles relative to a targeting vehicle. When predetermined threshold conditions are satisfied, warning signals are output from a computer system to alert a driver of the one or more targeted vehicles. In addition, steps may be taken to determine whether the targeting vehicle and the one or more targeted vehicles will converge to create a congested condition. If so, the speed of the targeting vehicle may be adjusted.

FIG. 1 shows a schematic top view of a vehicle 100. The vehicle 100 is intended to represent any type of vehicle adapted for land travel. The vehicle 100 includes an onboard computer system comprising a front detection system 102, a rear detection system 104, a signal processing unit 106, a cruise control system 108 and output devices 110, 112, 114, 116. The front detection system 102 and the rear detection system 104 are disposed at the front and rear of the vehicle 100, respectively. The front and rear detection systems 102, 104 are adapted to emit a signal into a space around the vehicle 100 and receive a reflected portion of the emitted signal. In particular, the front detection system 102 emits a signal substantially in front of the vehicle 100 while the rear detection system 104 emits a signal substantially to the rear of the vehicle 100. In one embodiment, the front detection system 102 emits a signal having a horizontal angular distribution of $\theta_1$ and the rear detection system 104 emits a signal with a horizontal angular distribution of $\theta_2$. In addition to a horizontal angular component, the signal emissions from the front and rear detection systems 102, 104 may have a vertical component $\theta_3$ and $\theta_4$, respectively. The angular components $\theta_1$–$\theta_4$ need not be static and, in one embodiment, are modulated to adjust the emission beam characteristic.

In general, the front and rear detection systems 102, 104 are any apparatus adapted to detect the presence, range and relative velocity of a target vehicle. In one embodiment, the front and rear detection systems 102, 104 are radar systems. Illustratively, the radar systems may include components known in the art such as antennas, transmitters, receivers, exciters, antennae beam pointing devices, timing and control units, signal processors, data processors, control and display units and the like. The antennae may be any device adapted to provide spacial directivity to a transmitted electromagnetic wave and then to intercept the scattering of that wave from the target. In one embodiment, the antennae may be a mechanically scanning or electronically scanning antennae such as a phased array and frequency scanned antennae. Transmitters are preferably solid state devices adapted to amplify wave forms to a power level sufficient for target detection and estimation. The receiver and exciter provide a subsystem containing the precision timing and frequency reference source or sources used to derive a master oscillator and local oscillator referenced frequencies. The exciter generates wave forms for subsequent transmission.

The front and rear detection systems 102, 104 preferably include a signal processing device adapted for pulse compression, Doppler filtering and detection threshold estimation and testing. In addition, the systems 102, 104 are configured for track filtering, user interface support and such specialized functions as electronic counter-counter measures (ECCM) and built-in-test (BIT), as well as the resource management processes required to control the radar system.

The signal processing unit 106 receives and processes input information from the front and rear detection systems 102, 104. As noted above, the front and rear detection systems 102, 104 may themselves include processing capabilities. Alternatively, the detection systems 102, 104 may act merely as data collection units adapted to transmit raw data to the signal processing unit 106 which may then process the data to determine the required information. In any event, the input received from the detection systems 102, 104, is utilized by the signal processing unit 106 to operate one or more of the cruise control system 108 and output devices 110, 112, 114, 116. The cruise control system 108 may be any known system adapted for setting and maintaining a desired speed. The output devices include a first indicator light 112 configured to indicate a targeted vehicle detected by the front detection system 102 and a second indicator light 114 configured to indicate a predicted congestion condition. The first and second indicator lights 112, 114 may be disposed on a display panel 118 viewable by an operator of the vehicle 100. The output devices further include a pair of mirror-based indicators 110, 116 configured to indicate a target vehicle detected by the rear detection system 104. A first mirror-based indicator 110 is disposed on an external rear view mirror 120 and a second mirror-based indicator 116 is disposed on an interior rear view mirror 122. As will be described in detail below, the indicators 110, 112, 114, 116 are operated by the signal processing unit 106 to provide a warning output to an operator of the vehicle 100.

FIG. 2 is a schematic representation of the signal processing unit 106. The signal processing unit 106 includes a central processor unit (CPU) 202, a memory 204, a storage 206, a pair of detection system interfaces 208a–b, a cruise control interface 210 and switches 212a–c (three shown). The components of the signal processing unit 106 are coupled by a bus 214.

The central processor unit 202 may include one or more processors configured to affect the operation of the signal processing unit 106. In one embodiment, the CPU 202 includes a digital signal processor (DSP).

The interfaces 208a–b, 210 may be any entry/exit device configured to communicate the CPU 202 with the external components (i.e., the front detection system 102, rear detection system 104 and cruise control system 108, respectively). In one embodiment, the interfaces 208a–b, 108 include analog-to-digital converters (A/D), filters and other mechanisms known in the art.

Memory 204 is preferably a random access memory (RAM) sufficiently large to hold the necessary programming and data structures of the invention. While memory 204 is shown as a single entity, it should be understood that memory 204 may comprise a plurality of modules, and that the memory 204 may exist at multiple levels, from high speed registers and caches to lower speed but larger DRAM chips, as well as static RAM (SRAM). When executed on the CPU 202, the data structures contained in memory 204 are adapted for use by the CPU 202 to control the input/output devices 106, 108 and the buffer memory 224. The contents of memory 204 can be loaded from and stored to the storage 210 as needed by the CPU 202.

In one embodiment, the memory 204 includes a detection system program 216 and a table 224 containing static data such as target vehicle threshold values. The detection system program 216 may further include a congestion prediction routine 218 and a user warning routine 220. When executed by the CPU 202, the detection system program 216 affects the desired operation of the detection systems 102, 104, the cruise control system 108 and the indicators 110, 112, 114, 116 as will be described below. The switches 212a–c are any device configured to control the supply of power to the indicators 110, 112, 114, 116. In one embodiment the switches 212a–c are solid state devices operated by the CPU 202 when executing the detection system program 216 and, more specifically, the user warning routine 220.

Storage 206 can be any known or unknown storage medium including a Direct Access Storage Device (DASD), a floppy disk drive, ROM, battery-packed RAM, removable memory cards, tape drives, an optical storage device and the like. Although storage 206 is shown as a single unit, it could be any combination of fixed and/or removable storage devices. Memory 204 and storage 206 could be part of one virtual address space spanning multiple primary and secondary storage devices. Although not shown, the storage 206 preferably also includes the configuration settings for the onboard computer system 100 which are loaded into memory 204 during the initiation sequence of the onboard computer system 100.

Figure 3:
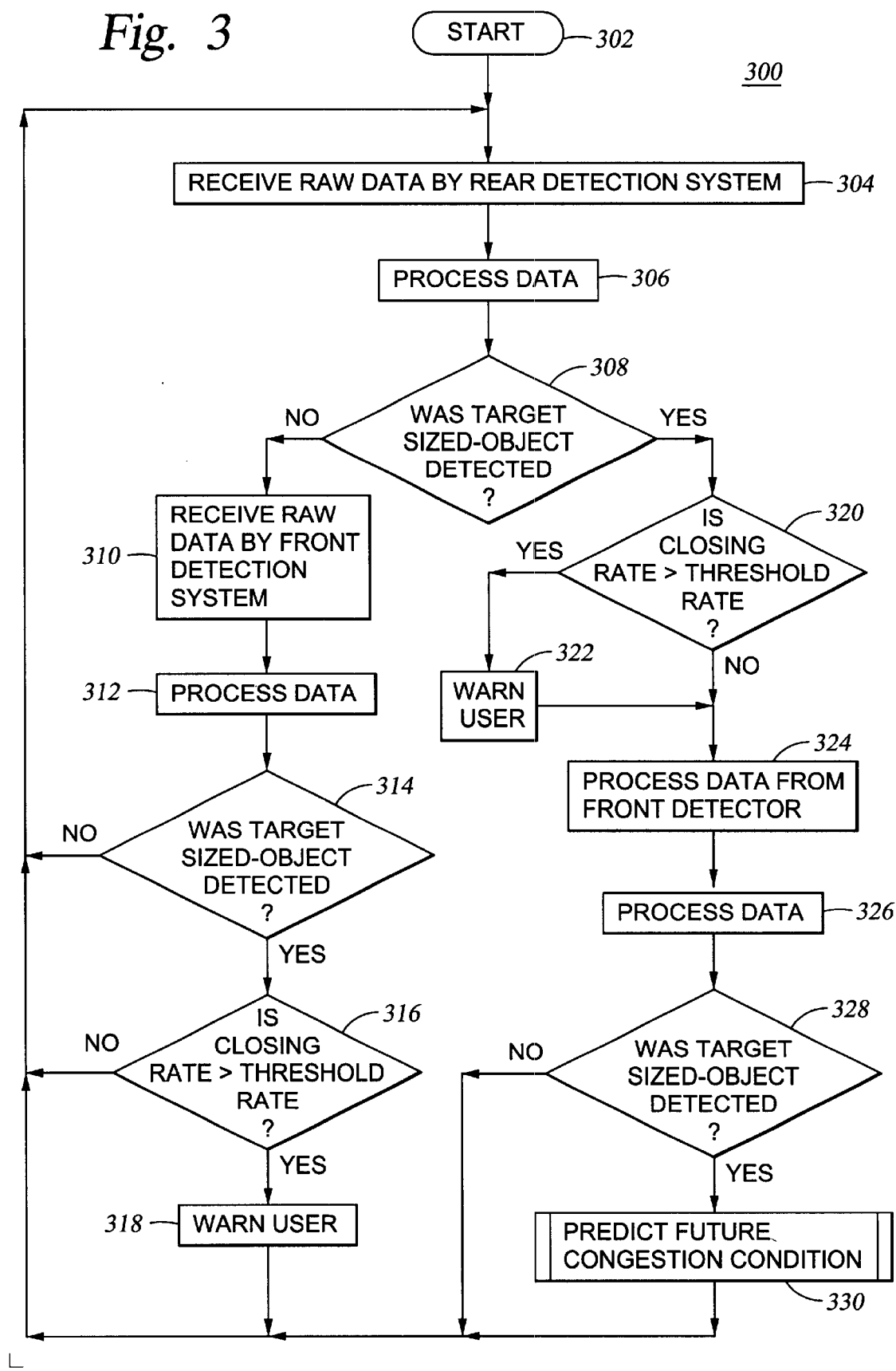
FIG. 3 is a flow diagram for a method of operating a detection system.

FIG. 3 shows a method 300 for the operation of the onboard computer system. The method 300 is initiated at step 302 which may occur when a driver begins operation of the vehicle 100 (also referred to hereinafter as the "targeting vehicle 100"). At step 304 raw data is received by the rear detection system 104 as a result of, for example, reflections from an emitted signal. At step 306 the raw data is processed to determine at least a range, a velocity and a closing rate of any detected object. As noted above, the detection system 104 may contain the necessary processing components to process the raw data and generate the desired information. Alternatively, the raw data may be transmitted to the signal processing unit 106 for processing.

At step 308, the method 300 queries whether a target-sized object was detected. In one embodiment, this information is provided by the rear detection system 104 which is configured to detect a range of target sizes from small targets (e.g., a motorcycle) to large targets (e.g., a truck). Thus, only objects within a preselected size profile are analyzed in order to reduce clutter.

If a target-sized object is not detected by the rear detection system 104, the method 300 proceeds to step 310 where raw data is received by the front detection system 102. At step 312 the raw data received by the front detection system 102 is processed to determine at least a closing rate of any detected object. At step 314, the method 300 determines whether a target-sized object is detected. If not, the method 300 returns to step 304. If a target-sized object is detected, the method 300 proceeds to step 316 to determine whether the closing rate of the detected target is greater than a threshold rate. Only targets moving at a relative speed greater than a threshold value are analyzed further. The threshold rate may be any rate selected to indicate a target which may pose a threat of creating a future congestion condition and about which the operator may desire to be notified. The threshold rate is contained in a table 224 and is accessed by the CPU 202 during execution of the detection system program 216 and, more particularly, the user warning routine 220. If the closing rate is not greater than a threshold rate, then the method 300 returns to step 304. If the closing rate is greater than a threshold rate, then, at step 318, the method 300 takes steps to warn a user of the vehicle 100. In one embodiment, step 318 involves activating the first indicator light 112. The driver may then take evasive measures such as slowing down, speeding up or changing lanes, to avoid creating a congestion pattern with the targeted vehicle.

If at step 308, a target sized object is detected, the method 300 proceeds to step 320 to determine whether a closing rate of the detected target is greater than a threshold rate contained in the threshold table 224. If so, the method 300 takes steps to warn the user of the vehicle 100 at step 322. In one embodiment, the signal processing unit 106 activates the pair of mirror-based indicators 110, 116 in order to alert the user to the approaching target vehicle. The user may then take evasive measures such as adjusting the speed of the vehicle 100 or changing lanes.

The method 300 proceeds from step 322, or from step 320 in the case of a negative determination, to step 324 where raw data is received by the front detection system 102. At step 326, the raw data is processed to determine at least a velocity range and closing rate of a detected target object. At step 328, the method 300 queries whether a target sized object was detected. If not, the method 300 returns to step 304. If a target-sized object was detected, then the method 300 takes steps to predict a future congestion condition at step 330.

Figure 4:
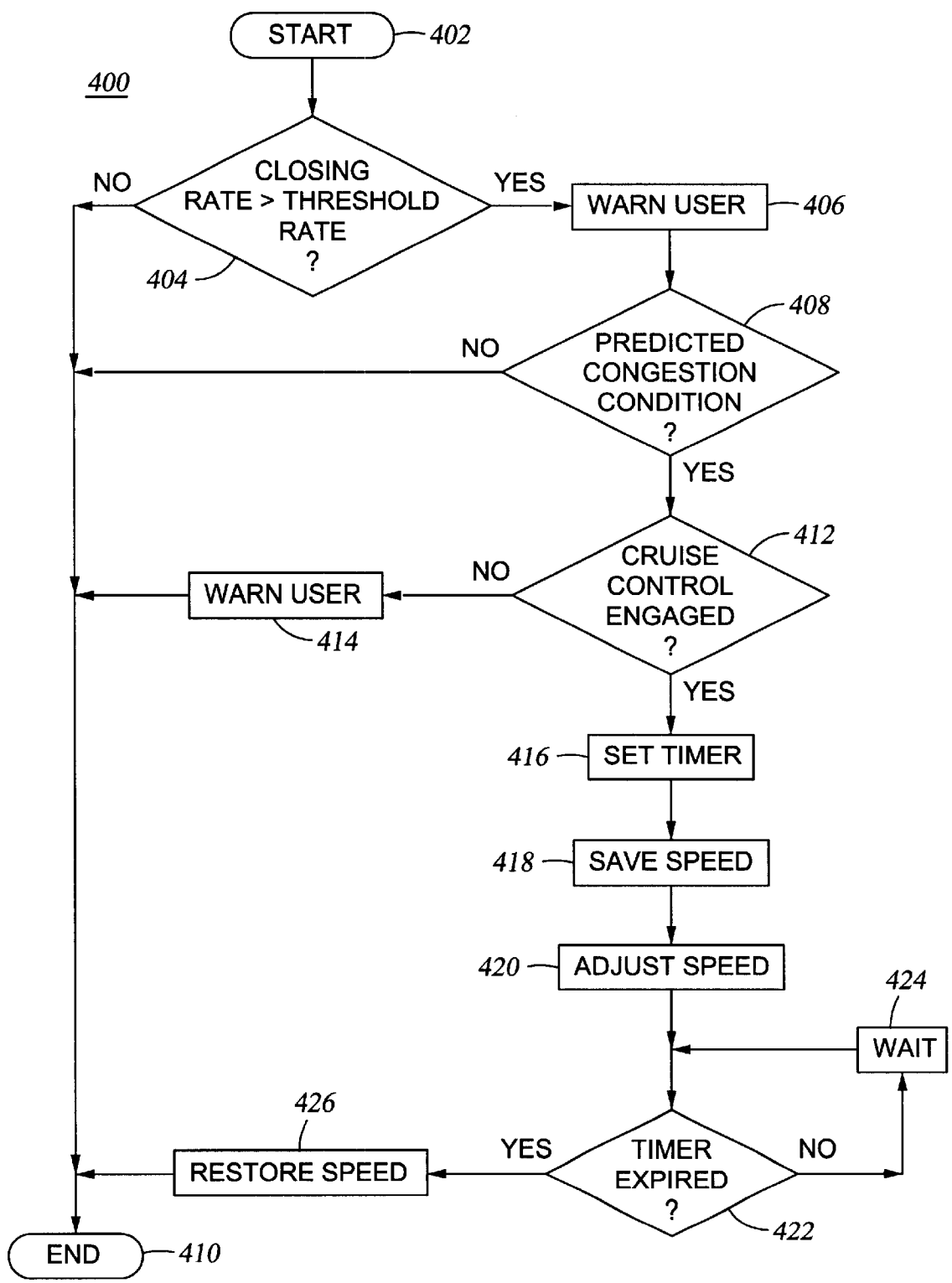
FIG. 4 is a flow diagram for operating a detection and control system.

One embodiment for predicting a future congestion condition at step 330 is shown by a method 400 illustrated in FIG. 4. The method 400 is entered at step 402 and proceeds to step 404 to determine whether the closing rate of the target vehicle is greater than a threshold rate retrieved from the table 224. If so, the user is warned at step 406 by activating the indicator device 112. It should be noted that the threshold rate utilized at step 404 need not be the same rate utilized at steps 316 and 320 of FIG. 3.

At step 408 the method 400 determines whether the detected target vehicles and the targeting vehicle 100 will converge to create a congestion condition. In one embodiment, the determination at step 404 comprises calculating a trajectory for each of the target vehicles and the targeting vehicle 100 based on their current respective velocities and relative distances and then determining whether the vehicles will simultaneously occupy a predetermined proximity relationship. The proximity relationship refers to any positional relationship between the vehicles requiring one or more of the vehicles to adjust one or more of its operating states, e.g., speed, direction, lane, etc. If step 408 is answered negatively, the method 400 is exited at step 410 and then returns to step 304 of method 300.

If step 408 is answered affirmatively, the method 400 proceeds to step 412 to determine whether the cruise control system 108 is engaged. If not, the user is warned of a possible congestion condition at step 414. In one embodiment, step 414 comprises activating the second indicator light 114. The method 400 is then exited at step 410. If the cruise control system 108 is engaged, the method 400 proceeds to step 416 where a timer is set. The timer is used to measure a predetermined time interval after which the speed of the vehicle 100 is returned to an initial value. At step 418, the initial set speed currently being maintained by the cruise control system 108 is stored in the memory 204. At step 420, the speed of the vehicle 100 is adjusted. Preferably, the adjusted speed of the vehicle 100 is selected to minimize the potential for a future congestion condition determined at step 408.

At step 422 the method 400 queries whether the timer has expired. If not, the method 400 waits a predetermined amount of time at step 424 and then returns to step 422. The loop comprising steps 422 and 424 is repeated until the timer has expired. The method 400 then proceeds to step 426 where the vehicle 100 is restored to its initial set cruise control speed (stored in memory 204 at step 418). The method 400 then exits at step 410 and returns to step 304 of method 300.

Figure 7:
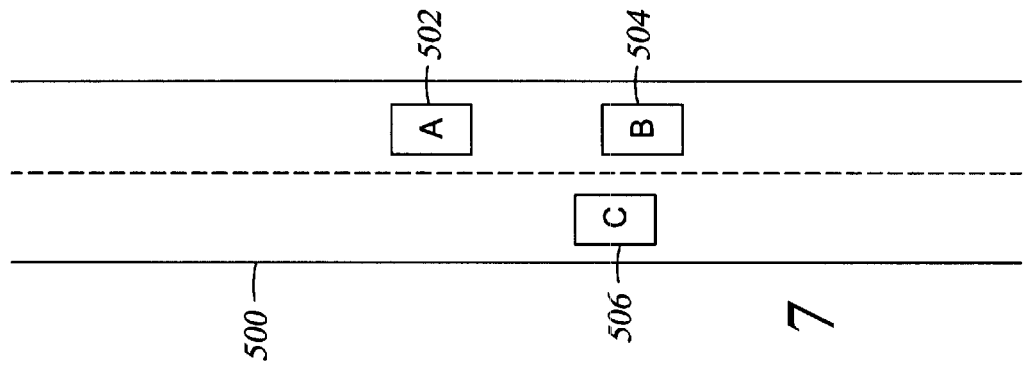
FIG. 7 is a top view of a road segment having vehicles disposed thereon and illustrating a second state having avoided a congestion condition.
Figure 6:
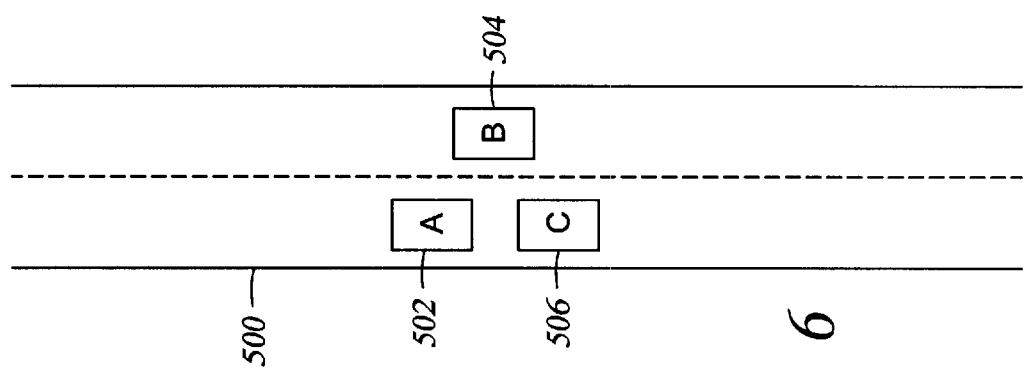
FIG. 6 is a top view of a road segment having vehicles disposed thereon and illustrating a congestion condition in a second state.
Figure 5:
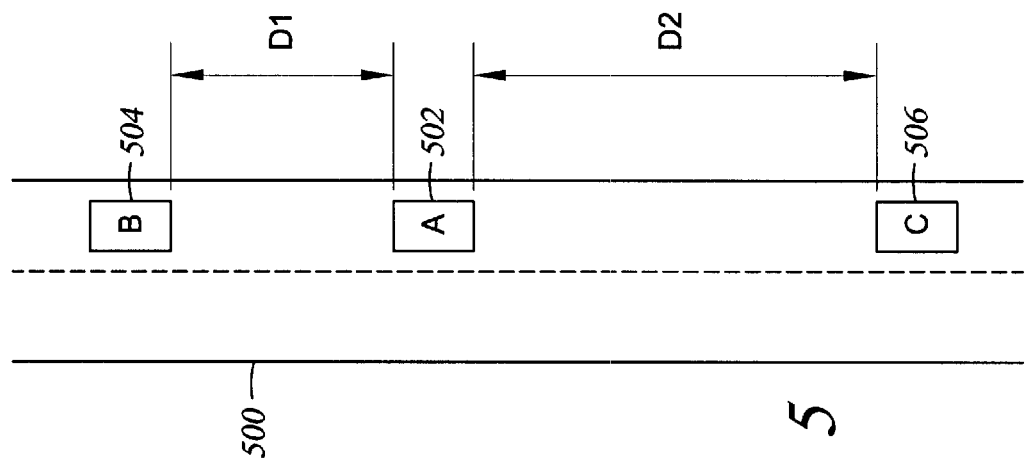
FIG. 5 is a top view of a road segment having vehicles disposed thereon and illustrating a relative distance and speed between the vehicles in a first state.

FIG. 5 shows a top view of a road segment 500 having a targeting vehicle 502, a first target vehicle 504, and a second target vehicle 506. The first target vehicle 504 is in front of the targeting vehicle 502 and can be detected by the front detection system 102. The second target vehicle 506 is behind the targeting vehicle 502 and can be detected by the rear detection system 104. The velocity, distance and closing rate of the target vehicles 504, 506 relative to the targeting vehicle 502 is determined in a manner described above. Illustratively, it is assumed that the determined values are processed to predict a congestion condition. In the event the vehicles are allowed to proceed without adjustments in their respective driving parameters, a congestion condition results, as shown by FIG. 6. If, however, the speed of the targeting vehicle 502 is adjusted in the manner described above, the congestion condition is avoided, as shown in FIG. 7. Illustratively, the speed of the targeting vehicle 502 was increased to move past the first target vehicle 504 and provide a free lane for the second target vehicle 506.

Embodiments of the invention are not limited to two target vehicle situations. Thus, any number of vehicles may be detected at a given time. In addition, the invention is not limited to situations involving a target vehicle forward of the targeting vehicle 100 (a leading vehicle) and a target vehicle rearward of the targeting vehicle 100 (a lagging vehicle). Embodiments of the invention contemplate detecting and responding to one or more leading vehicles or, alternatively, one or more lagging vehicles.

While the foregoing is directed to the preferred embodiment of the present invention, other and further embodiments of the invention may be devised without departing from the basic scope thereof, and the scope thereof is determined by the claims that follow.

What is claimed is:

1. A computer system, comprising:
    a detection system disposable on a vehicle and configured for rearward and forward detection of at least a speed of at least two target vehicles relative to the vehicle;
    a cruise control system;
    one or more output devices configured to receive a warning signal;
    a signal processing unit coupled to the detection system and the cruise control system and configured to:
        transmit the warning signal when a speed of a detected target vehicle is greater than a threshold speed relative to the vehicle;
        determine whether the vehicle and the at least two target vehicles will create a congestion area; and
    change a speed setting of the cruise control when it is determined that the congestion area will be created.

2. The computer system of claim 1, wherein the one or more output devices are disposed on rearview mirrors of the vehicle.

3. The computer system of claim 1, wherein the signal processing unit is configured to determine whether the vehicle and the at least two target vehicles will create the congestion area based on trajectories of the vehicle and the at least two target vehicles.

4. The computer system of claim 1, wherein the signal processing unit is configured to determine whether the vehicle and the at least two target vehicles will create the congestion area based on relative speeds between the vehicle and the at least two target vehicles.

5. The computer system of claim 1, wherein the congestion area is created when at least one of the vehicle and the at least two target vehicles is required to adjust vehicle speed.

6. The computer system of claim 1, wherein the vehicle detection system comprises a front detection system and a rear detection system.

7. The computer system of claim 6, wherein the front detection system is configured to detect a speed and a range of target vehicles in a first region forward of the vehicle and wherein the rear detection system is configured to detect a range and speed of target vehicles in a second region rearward of the vehicle.

8. The computer system of claim 1, wherein the signal processing unit is configured to detect each of the at least two target in separate lanes of a road.

9. The computer system of claim 1, wherein the signal processing unit is configured to increase the speed setting of the cruise control when the congestion condition is determined.

10. A signal bearing medium containing a program which, when executed by one or more processors, causes the processors to perform steps comprising:
    detecting at least a first target vehicle and a second target vehicle;
    determining whether either of the first target vehicle and the second target vehicle is approaching a targeting vehicle at a speed greater than a threshold speed; and
    if the speed is greater than the threshold speed, outputting a warning signal from an output device disposed on the targeting vehicle;
    determining whether the first target vehicle, the second target vehicle and the targeting vehicle will converge to create a congestion condition;
    if so, changing a speed setting of the targeting vehicle from an initial speed setting and then returning the targeting vehicle to the initial speed setting.

11. The signal bearing medium of claim 10, wherein outputting a warning signal from the output device comprises activating a warning device disposed on a rearview mirror of the targeting vehicle.

12. The signal bearing medium of claim 10, wherein the first target vehicle is detected forward of the targeting vehicle and the second target vehicle is detected rearward of the targeting vehicle.

13. The signal bearing medium of claim 12, wherein changing a speed setting of the targeting vehicle from an initial speed setting comprises increasing the speed setting.

14. The signal bearing medium of claim 10, wherein detecting the first target vehicle and the second target vehicle comprises detecting the first target vehicle in a first lane of a road and detecting the second target vehicle in a second lane of the road.

15. A method for operating a target vehicle detection system disposed on a targeting vehicle, comprising:
    detecting at least a first target vehicle and a second target vehicle;
    determining whether either of the first target vehicle and the second target vehicle is approaching the targeting vehicle at a speed greater than a threshold speed; and
    if the speed is greater than the threshold speed, outputting a warning signal from an output device disposed on the targeting vehicle;
    determining whether the first target vehicle, the second target vehicle and the targeting vehicle will converge to create a congestion condition; and
    if so, changing a speed setting of the targeting vehicle from an initial speed setting and then returning the targeting vehicle to the initial speed setting.

16. The method of claim 15, wherein detecting at least the first target vehicle and the second target vehicle comprises detecting the first target vehicle in a region rearward of the targeting vehicle and the second target vehicle in a region forward of the targeting vehicle.

17. The method of claim 15, wherein outputting a warning signal from the output device comprises activating a warning device disposed on a rearview mirror of the targeting vehicle.

18. The method of claim 15, wherein detecting the first target vehicle and the second target vehicle comprises detecting the first target vehicle in a first lane of a road and detecting the second target vehicle in a second lane of the road.

19. The method of claim 15, wherein the first target vehicle and the second target vehicle are in separate lanes and the targeting vehicle is in a common lane with one of the first and second vehicles.

20. A vehicular detection system, comprising:
   (a) a detection system disposable on a targeting vehicle and configured to detect at least a speed of at least a first target vehicle and a second target vehicle relative to the detection system;
   (b) a signal processing unit coupled to the detection system and configured to:
      determine whether the speed of at least one of the first and second target vehicles is greater than a threshold speed relative to the detection system; and
      if the speed is greater than the threshold speed, determine whether the first target vehicle, the second target vehicle and the detection system will converge to create a congestion condition; and
   (c) a cruise control system connected to the signal processing unit; wherein the signal processing unit is configured to change a speed setting of the cruise control when the congestion condition is determined.

21. The vehicular detection system of claim 20, wherein the detection system comprises a front detector and a rear detector.

22. The vehicular detection system of claim 20, wherein the signal processing unit is configured to change the speed setting of the cruise control from a first speed to a second speed when the congestion condition is determined and further configured to return the speed setting to the first speed after a period of time.

23. The vehicular detection system of claim 20, wherein the signal processing unit determines that the first target vehicle, the second target vehicle and the detection system will converge to create the congestion condition when a least one of the vehicles and the detection system must change at least one of a respective speed and direction to avoid a collision based upon current trajectories.

24. The vehicular detection system of claim 20, further comprising:
   at least one rear view mirror disposed on the targeting vehicle; and
   an output device disposed on the at least one rear view mirror and connected to the signal processing unit to receive a warning signal therefrom if the speed is greater than the threshold speed.

* * * * *